United States Patent Office

2,794,831
Patented June 4, 1957

2,794,831

SEPARATION OF ISOPHTHALIC AND TEREPHTHALIC ACIDS

Art C. McKinnis, Long Beach, Calif., assignor to Union Oil Company of California, Los Angeles, Calif., a corporation of California No Drawing. Application November 8, 1954, Serial No. 467,660

8 Claims. (Cl. 260—525)

This invention relates to new solvent extraction or fractional crystallization processes for separating mixtures of isophthalic and terephthalic acids. The common feature of the claimed procedures consists in employing a selective solvent consisting essentially of an N,N-dialkyl formamide. These solvents may be employed to selectively extract isophthalic acid from mixtures thereof with terephthalic acid, or the acid mixture may be dissolved in the solvent and terephthalic acid fractionally crystallized therefrom by cooling or evaporation of solvent.

The separation of isomeric benzene dicarboxylic acids to obtain the pure meta- and para-isomers is a difficult problem. Phthalic acid, the ortho isomer, is readily separated from the meta- and para-isomers since it alone forms an anhydride. However, the usual physical and chemical methods are not effective for separating isophthalic from terephthalic acid because of their very similar chemical and physical properties. Heretofore, one method for separating these acids has involved forming the alkyl esters of the acids, fractionating the esters, and hydrolyzing the individual ester fractions. Alternatively the isophthalic acid may be selectively esterified without esterifying substantial amounts of terephthalic acid, and the unesterified terephthalic acid separated as such from the esterification mixture. Still another method of separation by esterification involves completely esterifying and then selectively saponifying whereby the terephthalic acid is preferentially hydrolyzed. All of these esterification methods involve an economically undesirable number of steps.

Neither solvent extraction nor fractional crystallization from solvents has been employed to any great extent because of the very limited solubility of both isophthalic acid and terephthalic in all common solvents. In my copending joint application, Serial No. 321,049, filed November 17, 1952, now Patent No. 2,741,633 I have described the use of aqueous alcohols as selective solvents. However, in general the alcoholic solvents exhibit economically feasible solvent capacity only at relatively high temperatures necessitating the use of pressure equipment in some cases. In another copending application, Serial No. 301,304, filed July 28, 1952, now Patent No. 2,760,974 I have described the use of hexaalkyl phosphoryl amides as selective solvents for separating isophthalic from terephthalic acid. However, the phosphoryl amides, while displaying considerable solvent capacity, exhibit a complicating tendency to form hydrogen-bonded adducts with the dibasic acids, which adducts are stable, chemically discrete compounds having melting points above 50° C. The differential solubility of the adducts in the solvent, e. g. hexamethyl phosphoryl amide, is apparently less than would be the differential solubility of the acids themselves if no adducts were formed, judging by the larger differential solubilities shown in non-adduct forming solvents such as methanol. For example, at 25° C., isophthalic acid is about 15 times as soluble as terephthalic acid in methanol, but in hexamethyl phosphoryl amide, the isophthalic acid adduct is only about 3.5 times as soluble as the terephthalic acid adduct.

It has now been found that the N,N-dialkyl formamides display certain advantages over any of the above solvents. In general they display a solvent capacity for the acids which is comparable to hexamethyl phosphoryl amide, but since stable adducts are not formed, the selectivity factor is comparable to methanol. For example, at 25° C., it is found that isophthalic acid is about 7 times as soluble as terephthalic acid in dimethyl formamide. Moreover, the dimethyl formamide will dissolve an equal amount of terephthalic acid and a greater amount of isophthalic acid than will an equal volume of hexamethyl phosphoryl amide without precipitation of solids. It will be apparent therefore that the N,N-dialkyl formamides are highly advantageous for separating isophthalic acid from terephthalic acid.

From the above discussion it is clear that the primary objective of this invention is to provide solvents for the separation of isophthalic and terephthalic acids which exhibit a maximum selectivity and an optimum relationship between selectivity and capacity.

Another object of the invention is to provide moderate temperature ranges for employing the solvent, thereby avoiding the use of pressure equipment.

A further object is to avoid chemical reactions such as esterification and adduct-formation between solvent and solute.

All of these general objectives are directed toward obtaining a separation of isophthalic and terephthalic acids by solvent extraction or fractional crystallization whereby each acid may be obtained in maximum purity.

The aromatic dicarboxylic acids, particularly terephthalic acid, have recently become highly important commercial materials by virtue of their use in the manufacture of certain synthetic polymers such as Dacron. In the past, terephthalic acid has generally been manufactured by the controlled oxidation of pure para-xylene. This process is economically undesirable in that it requires as the starting material substantially pure para-xylene.

Para-xylene is ordinarily obtained as a by-product from certain petroleum fractions, especially reformate fractions obtained by the hydroforming of naphthenic petroleum fractions in the presence of certain catalysts such as cobalt molybdate or platinum. From these aromatic fractions may be obtained, as a close-boiling cut, a mixture of meta-, para-, and ortho-xylenes and ethylbenzene, which mixture boils between about 135° C. to 145° C. The ortho-xylene is the highest boiling material, boiling at 144° C. and is hence ordinarily removed by fractional distillation. The ethylbenzene may also be removed by efficient fractional distillation. However, the remaining mixture of meta- and para-xylene is extremely difficult to separate into the pure components. A great variety of methods have been proposed for separating these isomers, but all the presently known methods are difficult and expensive.

This invention obviates the difficulties involved in the xylene separation problem by providing an economical method for separating the oxidation products of the para-xylene-meta-xylene mixture.

As indicated above the invention is based primarily upon the use of certain specific solvents for selective extraction or fractional crystallization, which solvents consist of the N,N-dialkyl formamides. The relationship between solvent capacity and selectivity of various solvents at 25° C. is indicated by the following data:

TABLE 1

| Solvent | Solubility at 25° C., gm./100 ml. | | Relative solubility, Isophthalic Acid/ Terephthalic Acid |
|---|---|---|---|
| | Isophthalic Acid | Terephthalic Acid | |
| Water | 0.013 | ins | ∞ |
| Acetone | 0.57 | | |
| Dioxane | 1.3 | | |
| Methanol | 1.6 | 0.11 | 14.5 |
| Hexamethyl phosphoryl amide | ¹25 | ¹7 | ¹3.58 |
| Dimethyl formamide | 49 | 7 | 7.0 |

¹ Equilibrium solid phase is adduct of 1 mole dibasic acid + 2 moles solvent.

From the above table it will be seen that water, acetone, dioxane and methanol show good selectivity for isophthalic acid, but poor solvent capacity at 25° C. Hexamethyl phosphoryl amide shows good solvent capacity but relatively poor selectivity at low temperatures. Dimethyl formamide shows both good selectivity and good capacity. The above figures represent the individual solubility of the particular acid in the absence of the other isomer. In some solvents the relative solubility is altered when both acids are present. However in the case of dimethyl formamide it is found that when both acids are present, the relative solubilities remain approximately the same.

Those skilled in the art will readily understand the application of the above data to the actual extraction or crystallization procedures. Any method commonly employed in the art for solvent extraction of a solid with a liquid may be employed. For example the solvent may be repeatedly percolated at e. g. —20°—+150° C. through a bed of the mixed acids, or a slurry may be formed and separated by filtration or centrifuging into an extract and a solid residue fraction. Normally, the extraction is continued until one or the other of the acids is substantially completely removed from the solid phase. The remaining solid may be either isophthalic acid or terephthalic acid, depending on the initial composition of the mixture. In treating mixtures containing originally more than about 0.14 part of terephthalic acid per part of isophthalic acid, the residue will be terephthalic acid; if the mixtures contained less than about 0.14 parts of terephthalic acid per part of isophthalic acid, the residue will be isophthalic acid. In this manner substantially 100% pure terephthalic acid or isophthalic acid may be obtained.

The extract may be treated in any desired manner for recovery of the isophthalic acid, e. g. the solvent may be distilled and recovered leaving a solid residue which is predominantly isophthalic acid. The isophthalic acid recovered in this manner may be from about 80–90% pure when operating under the preferred conditions, i. e. at fractional crystallization temperatures from about 0–75° C. and solvent-to-isophthalic acid ratios from about 2 to 5 ml. per gm.

In fractional crystallization procedures, the acid mixture is dissolved in the solvent, preferably at a relatively high temperature, e. g. between about 50° and 150° C., then cooled and/or evaporated to obtain fractional crystallization. If the original mixture contained more than about 0.14 parts of terephthalic acid per part of isophthalic acid, the first portion to crystallize at temperatures between about —20° and 50° C. is relatively pure terephthalic acid, which becomes less pure as the solubility limit of isophthalic acid is reached. If the original mixture contained less than about 0.14 parts of terephthalic acid per part of isophthalic acid, the first portion to crystallize at temperatures between about —20° and 50° C. is relatively pure isophthalic acid, which becomes less pure as the solubility limit of terephthalic acid is reached. In either case, before the fractional crystallization is carried to the extent of producing an undesirably mixed crystallizate, the solid phase is removed as by filtration, centrifuging or the like, washed if desired with a selective solvent for the undesired acid, and dried to obtain 96–100% pure terephthalic or isophthalic acid. The mother liquor may then be evaporated to obtain an 80–90% isophthalic acid residue.

This recovered mother liquor solute may be further resolved by fractional crystallization from another solvent, e. g. methanol or hexamethyl phosphorylamide, in which the acids exhibit a differential solubility other than the 7/1 ratio obtaining in dimethyl formamide. The fractional crystallization from methanol yields an additional crop of terephthalic acid, and the mother liquor solute therefrom may then be again fractionated from dimethyl formamide to obtain a crop of substantially pure isophthalic acid. In this manner, by alternate fractional crystallization of mother liquor solutes from methanol and from dimethyl formamide, substantially complete resolution may be obtained. The term "mother liquor solute" refers to the dibasic acids remaining dissolved in a crystallization mother liquor, wherein the ratio of isophthalic acid/terephthalic acid is such that further resolution is impossible from the particular solvent.

In any of the above procedures, the relatively pure terephthalic acid crystallized from the solvent, or left as residue from solvent extraction, may be further rectified to 100% purity by recrystallization from the same solvent. Obviously any combination of solvent extraction and fractional crystallization may also be employed.

The following examples are cited by way of illustration, and should not be considered as limiting.

*Example I*

A mixture consisting of 50 gms. isophthalic acid and 50 gms. terephthalic acid is placed in a flask and 110 ml. of N,N-dimethyl formamide is added. The slurry is heated and agitated at 65° C. for about one-half hour (complete solution not obtained) and then filtered. The filter cake is washed with 50 ml. of the solvent at 20° C. and the wash liquid is separately collected. Upon distillation of the extract filtrate, about 57 gms. of 85% isophthalic acid is obtained. The washed and dried filter cake consists of about 40 gms. of 98% pure terephthalic acid. The wash liquor contains about 3 gms. of mixed acids.

*Example II*

A mixture consisting of 50 gms. isophthalic acid and 50 gms. terephthalic acid is placed in a flask and 250 ml. of N,N-dimethyl formamide is added. The mixture is heated and agitated at 120° C. until complete solution is obtained. The solution is then cooled to 20° C. and allowed to stand for several minutes until crystallization is complete. The slurry is then filtered and the filter cake washed with 50 ml. of cold dimethyl formamide. The dried filter cake consists of about 35 gms. of 99+% pure terephthalic acid.

The mother liquor from the above crystallization is then evaporated down to a total volume of about 130 ml., and again cooled to 20° C. to obtain an additional 7 gm. crop of 98% pure terephthalic acid. The remaining mother liquor is then evaporated to dryness leaving about 56 gms. of 87.5% pure isophthalic acid.

The above procedures may be similarly employed, with like results, utilizing other N,N-dialkyl formamides, preferably the lower alkyl compounds. Other suitable N,N-di-substituted compounds include diethyl formamide, ethyl-methyl formamide, di-n-propyl formamide, di-isopropyl formamide, ethyl-isopropyl formamide, methyl-isopropyl formamide and the like. Also, any of the foregoing solvents may be modified by the addition thereto of small proportions, e. g. 2–30% by volume of other solvents such as water, methanol, ethanol, isopropanol, acetone, dioxane, or the like. Obviously many variations in the above procedures will occur to those skilled in the art, and they should therefore not be considered as limiting. The true scope of the invention is intended to be embraced by the following claims.

I claim:

1. A method for altering the composition of an initial mixture of terephthalic and isophthalic acid which comprises contacting said mixture with a solvent consisting essentially of a liquid N,N-di(lower alkyl) formamide, the mole-ratio of isophthalic acid/terephthalic acid in said initial mixture being different from the solubility ratio of said acids in said solvent at the contacting temperature, thereby selectively dissolving the one of said acids $A_1$ which was initially present in less than its solubility ratio, and separating from the resulting mixture a solid phase enriched in the other of said acids $A_2$.

2. A method as defined in claim 1 wherein said solvent is essentially N,N-dimethyl formamide.

3. A method as defined in claim 1 wherein said contacting procedure consists of solvent extraction whereby said acid $A_1$ is selectively dissolved, and a part of the original acid mixture remains undissolved constituting said solid phase enriched in the other of said acids, $A_2$.

4. A method as defined in claim 1 wherein said contacting procedure includes dissolving said acid mixture and then fractionally crystallizing the resulting solution to obtain a mother liquor relatively enriched in said acid $A_1$, and a crystalline precipitate constituting said solid phase enriched in the other of said acids, $A_2$.

5. A method for obtaining substantially pure terephthalic acid from a mixture thereof with isophthalic acid which comprises dissolving said mixture in a solvent consisting essentially of an N,N-di(lower alkyl) formamide and then subjecting the resulting solution to fractional crystallization, the mole-ratio of isophthalic acid/terephthalic acid in said mixture being less than the solubility ratio of isophthalic acid/terephthalic acid in said solvent at the fractional crystallization temperature, whereby substantially pure solid terephthalic acid is obtained as crystallizate.

6. A method as defined in claim 5 wherein said mixture of acids contains more than about 0.14 parts of terephthalic acid per part of isophthalic acid, and said solvent is N,N-dimethyl formamide.

7. A method for obtaining substantially pure isophthalic acid from a mixture thereof with terephthalic acid which comprises dissolving said mixture in a solvent consisting essentially of an N,N-di(lower alkyl) formamide and then subjecting the resulting solution to fractional crystallization, the mole-ratio of terephthalic acid/isophthalic acid in said mixture being less than the solubility ratio of terephthalic acid/isophthalic acid in said solvent at the fractional crystallization temperature, whereby substantially pure solid isophthalic acid is obtained as crystallizate.

8. A method as defined in claim 7 wherein said mixture of acids contains less than about 0.14 parts of terephthalic acid per part of isophthalic acid, and said solvent is N,N-dimethyl formamide.

References Cited in the file of this patent

UNITED STATES PATENTS 2,664,440    Toland _____ Dec. 29, 1953

OTHER REFERENCES

Ward: Chem. Abs., vol. 37, 1943, p. 518.